United States Patent
Blonstein et al.

[11] Patent Number: 5,835,156
[45] Date of Patent: Nov. 10, 1998

[54] TELEVISION GRAPHICAL USER INTERFACE EMPLOYING REMOTE RANDOM ACCESS POINTING DEVICE

[75] Inventors: Steve Blonstein; Jack Chaney, both of San Jose, Calif.

[73] Assignee: Samsung Electroncis, Ltd., Kyungki-do, Rep. of Korea

[21] Appl. No.: 720,501

[22] Filed: Sep. 30, 1996

Related U.S. Application Data

[60] Provisional application No. 60/023,904 Aug. 14, 1996.
[51] Int. Cl.⁶ ................................................ H04N 5/50
[52] U.S. Cl. ................................. 348/569; 348/564
[58] Field of Search ............................ 348/569, 563, 348/564, 589, 600; H04N 5/445, 5/50

[56] References Cited

U.S. PATENT DOCUMENTS

| | | | |
|---|---|---|---|
| 5,045,843 | 9/1991 | Hansen | 340/709 |
| 5,198,901 | 3/1993 | Lynch | 358/136 |
| 5,293,229 | 3/1994 | Lu | 348/415 |
| 5,311,310 | 5/1994 | Jozawa | 348/416 |
| 5,359,348 | 10/1994 | Pilcher et al. | |
| 5,361,105 | 11/1994 | Lu | 348/699 |
| 5,386,234 | 1/1995 | Veltman et al. | 348/409 |
| 5,400,076 | 3/1995 | Iwamura | 348/416 |
| 5,489,947 | 2/1996 | Cooper | 348/589 |
| 5,673,201 | 9/1997 | Klingelhofer | 348/578 |

*Primary Examiner*—Sherrie Hsia
*Attorney, Agent, or Firm*—Lowe Hauptman Gopstein Gilman & Berner

[57] ABSTRACT

A satellite television receiver using a remote pointing device to provide random user access to a graphical user interface (GUI) displayed on a TV screen. When motion of the user's hand that holds the pointing device commands a cursor to move across the TV screen from any initial position to a position selected by the user, a CPU generates X, Y-coordinates that define the cursor path to the selected position. Cursor movement is displayed by multiple erasures and redraws of the cursor. The GUI may present a graphical channel changer that enables the user to tune an RF tuner of the TV receiver to a selected TV channel by directing the pointing device at the logo of the selected TV channel on the screen.

20 Claims, 10 Drawing Sheets

| CLUT location | Red Byte | Green Byte | Blue Byte | Output Color |
|---|---|---|---|---|
| $0 | $0 | $0 | $0 | Black |
| $1 | $ff | $0 | $0 | Full Red |
| $2 | $80 | $0 | $0 | Half Red |
| $3 | $40 | $0 | $0 | Dim Red |
| $4 | $ff | $ff | $ff | White |
| $5 | $80 | $80 | $80 | Med. gray |
| $6 | $00 | $ff | $00 | Full Green |
| $7 | $00 | $00 | $ff | Full Blue |
| $8 | $00 | $ff | $ff | Cyan |
| etc. | etc. | etc. | etc. | etc. |

# TELEVISION GRAPHICAL USER INTERFACE EMPLOYING REMOTE RANDOM ACCESS POINTING DEVICE

This application claims the benefit of U.S. Provisional Application No. 60/023,904 filed Aug. 14, 1996.

1. Technical Field

The present invention relates to television (TV) systems, and in particular, to a TV graphical user interface (GUI) that interacts with a remote pointing device to provide random user access to various options displayed on a TV screen.

2. Background Art

The growing availability of TV broadcast and interactive services creates a need for a new type of a TV control system that would facilitate user access to options offered by TV program providers. For example, direct broadcast satellite services require users to make their selection among about a thousand TV channels with various TV programs and services. Direct television satellite broadcasting is provided via direct broadcast satellites at an uplink frequency of 17.3 to 17.9 GHz and a downlink frequency of 12.2 to 12.7 GHz.

A digital satellite television system for direct television broadcasting includes a transmitter for transmitting television signals including video and audio components to a satellite. The satellite retransmits the received television signals to an outdoor antenna assembly that includes a dish-like antenna and a block converter. The dish-like antenna directs the received television signals to the block converter that converts the frequencies of the received television signals to respective lower frequencies.

The television signals produced by the block converter are connected via a coaxial cable to an indoor satellite receiver coupled to a TV set. The satellite receiver tunes, demodulates and otherwise processes the received television signals to provide video and audio signals with a NTSC, PAL or SECAM format suitable for processing by the TV set that produces an image on a display screen in response to the video signals, and an audible response by means of speakers in response to the audio signals.

Within the transmitter, analog video and audio signals are converted to respective digital signals compressed according to the Motion Picture Expert Group (MPEG) encoding standard. The resultant digital signals are represented by a stream of packets including error correction data. The type of packets is identified by a header code. Packets corresponding to control data may also be added to the packet stream.

In the MPEG standard, the video information may be transmitted in the form of a luminance (Y) component and two color difference (U and V) components. For example, the first color difference component may represent the difference between the red image information and the luminance image information (R-Y), and the second color difference component may represent the difference between the blue image information and the luminance image information (B-Y). In addition, the color information is compressed because the two color difference components correspond to more than one picture element. The use of color difference components and the sharing of the color difference components between picture elements reduces the transmission bandwidth.

The digital information resulting from the compression and error correction encoding is modulated on a carrier using Quaternary Phase Shift Keying (QPSK) modulation and transmitted to a satellite for retransmission.

The satellite receiver comprises a tuner for selecting the appropriate carrier signal retransmitted by the satellite and for converting the frequency of the selected carrier to an intermediate frequency (IF) signal. A QPSK demodulator demodulates the IF signal and supplies it to an error-correcting decoder to correct demodulated packets representing video and audio information. An MPEG decoder decodes and decompresses video and audio packets to form digital video and audio signals supplied to a TV set. A TV set-top box serves to deliver compressed digital video and audio signals in real time usable form to one or more TV sets.

As discussed above, the digital satellite television system may provide about a thousand TV channels with various TV programs and services. Therefore, it would be desirable to provide a graphical user interface (GUI) on a TV screen that would facilitate user access to available TV programs and services.

A conventional TV set typically uses a remote control device to control TV set operations. A conventional remote control device often comprises a set of four direction-control keys (up, down, left, and right) that allow a user to select a row or column of a menu displayed on a TV screen. A sequence of presses is required to reach a desired position on the menu. Then, a function key should be pressed to carry out a required function, for example, to tune to a selected TV channel, to select a required TV program, to record this program, or to obtain information on the program. This control procedure is very time-consuming and inconvenient.

Such control devices as trackballs include balls rotated by a user to move a cursor on a screen. However, to move the cursor between two points near opposite sides of the screen, the ball must be rotated using multiple turns by the user's thumb to allow the cursor to traverse the entire screen. It would be desirable to provide a TV GUI that would enable the user to have random access to any option displayed on the screen using hand motions more convenient than heretofore provided for TV GUI systems.

A remote pointing device such as an Airmouse would provide direct interaction between the user hand and the TV screen. As a result, slight movement of the hand would be sufficient to enable the user to reach any point on the screen.

DISCLOSURE OF THE INVENTION

Accordingly, one advantage of the present invention is in providing a graphical user interface (GUI) on a TV screen that would facilitate user access to numerous TV programs and services offered by TV program providers.

Another advantage of the present invention is in providing a TV GUI that would interact with a remote control device to enable a user to have random access to any option displayed on the screen.

The above and other advantages of the invention are achieved, at least in part, by providing a television system using a remote pointing device that interacts with a graphical user interface displayed on a TV screen. The system comprises a central processing unit (CPU), and an interface control circuit that provides two-way wireless communications with the remote pointing device. A graphics accelerator interacts with the CPU to display graphics data representing options offered by the graphical user interface, and to support the remote pointing device in providing random user access to the options displayed on the TV screen.

In accordance with one aspect of the invention, the graphical user interface comprises a graphical channel changer displayed on the TV screen to enable a user to select TV channels. In response to selecting a TV channel on the graphical channel changer, the CPU issues a command to"

tune a radio-frequency tuner of the TV system to the selected TV channel. For example, the graphical channel changer may contain graphical objects that represent various TV channels. The CPU tunes the radio-frequency tuner to the selected TV channel when the user holds the remote pointing device in the direction of a graphical object that represents the selected TV channel.

In accordance with another aspect of the invention, the TV system includes a graphics memory that stores the graphics data as a two-dimensional array of data items representing a picture to be displayed on the TV screen. The data items in each line of the array represent pixels to be displayed along the horizontal direction on the TV screen, and the data items in each row of the array represent pixels to be displayed along the vertical direction on the TV screen. The graphics accelerator may include a color look-up table for translating values of the data items stored in the graphics memory into values representing pixels to be displayed on the TV set. Each of the pixel values may comprise bytes that represent red, green and blue components of the picture to be displayed on the TV screen.

In accordance with a further aspect of the invention, the CPU and the graphics accelerator interact to move a cursor on the TV screen in response to a motion of a user hand. The CPU may provide X, Y-coordinates of the cursor to represent its position on the TV screen. Movement of the cursor may be displayed by multiple erasures and redraws of the cursor. The graphics accelerator allows the cursor movement to keep up with fast motion of the pointing device.

A single button on the pointing device may be clicked to activate the cursor on the TV screen and to make a selection among the options. Alternatively, a button on the pointing device may be touched to display an option on the TV screen.

In accordance with a method of the present invention, the following steps are carried out:

a) directing a remote pointing device at a selected position on the TV screen, b) receiving a position change data from the remote pointing device via a wireless communication link, c) generating cursor control data to control movement of a cursor image on the TV screen in response to the position change data, d) generating coordinates for defining a path on the TV screen for moving the cursor image to the selected position, e) erasing the cursor image displayed in an initial position on the path, g) drawing the cursor image in an intermediate position on the path, and f) repeating steps e and g until the intermediate position coincides with the selected position.

The cursor image may move from the initial position to the selected position via a straight path on the screen.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

The best mode for practicing the invention is based on the realization of a satellite receiver in a digital satellite television system. However it is to be understood that the present invention is applicable to any system for receiving TV signals.

Figure 1:
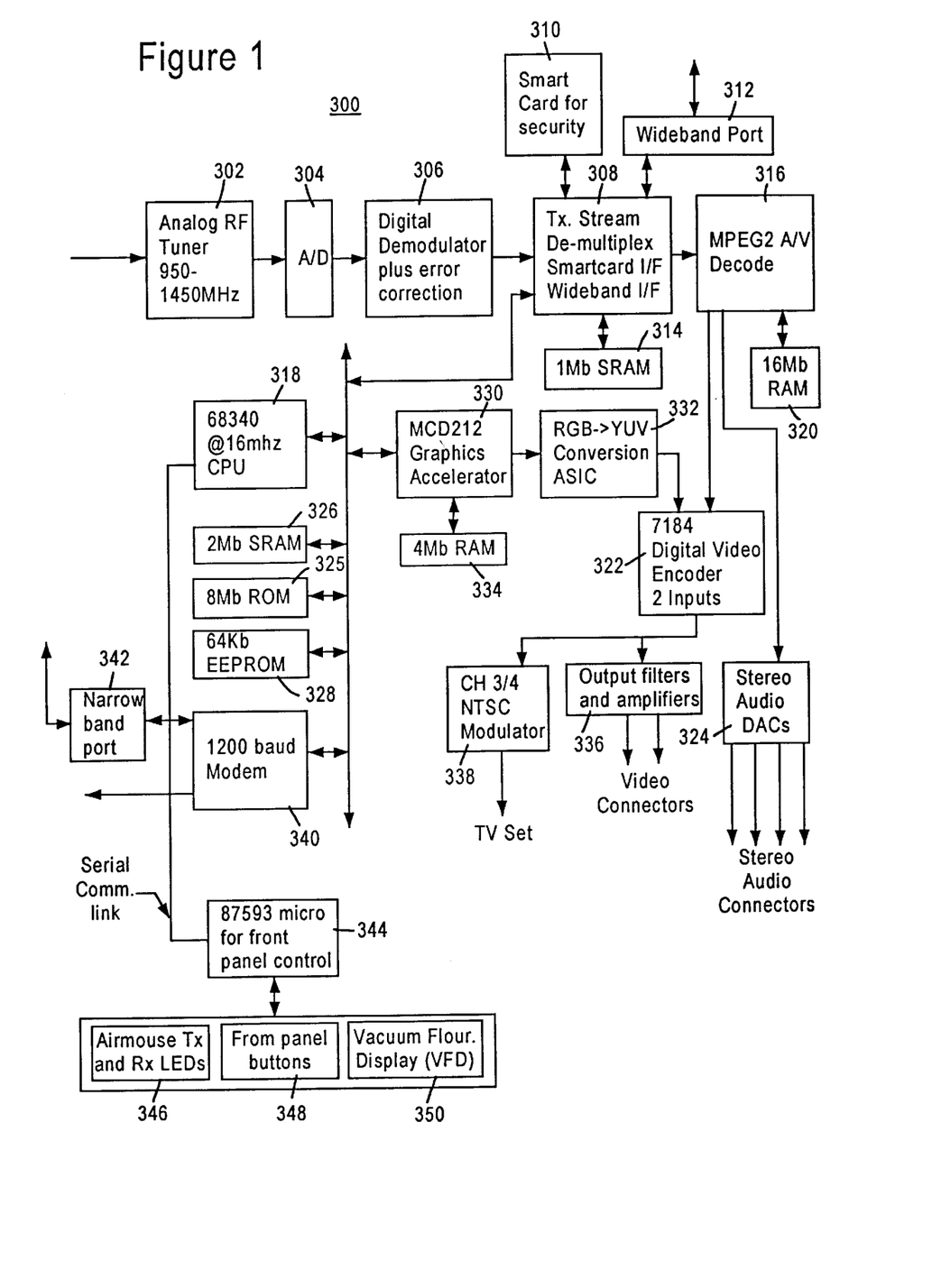
FIG. 1 is a block diagram of a satellite receiver of the present invention.

Reference is now made to FIG. 1 of the drawings wherein an indoor satellite receiver 300 includes an analog radio-frequency (RF) tuner 302 such as a satellite front end demodulator manufactured by Sharp/Comstream. The RF tuner 302 is coupled via an external UHF/VHF to an outdoor unit that receives incoming television signals from a satellite. The outdoor unit may comprise a 18" antenna made of aluminum and dual low noise block converters that convert satellite signals in a frequency range from 12.2–12.7 GHz received by the antenna into the 950–1450 MHz frequency range signals.

The RF tuner 302 equipped with a local oscillator and mixer selects the appropriate carrier signal corresponding to a selected satellite TV channel from the 950–1450 MHz signals received from the outdoor unit. The frequency of the selected carrier is converted to an intermediate frequency (IF) signal fed to an analog-digital converter 304 that produces a digital IF signal.

A digital demodulator 306 performs QPSK demodulation of the digital IF signal and carries out multiple error correction algorithms required to decode error correction data contained in the received signal. For example, Viterbi and Reed-Solomon error correction algorithms may be employed. A single ASIC manufactured by Comstream may be used as the digital demodulator 306.

The decoded digital signal is fed to a transport chip 308 responsible for demultiplexing video, audio and data signals. The transport unit 308 is also connected to a card 310 for providing conditional access to the satellite receiver 300. The card 310 such as a Smart Card manufactured by the News Data Corporation controls access to paid channels and services using the Data Encryption Standard (DES).

Wideband data are fed to the transport unit 308 via a wideband port 312 that provides compatibility with 16:9 wide NTSC format. The wideband port is also controlled by the conditional access system. A buffer 314 is used to support the transport chip operations. A 128K×8 static random-access memory (SRAM) with access speed of 70 ns may be used as the buffer 314.

The transport chip 308 routes the video and audio signals to an MPEG decoder 316, while data is made available to a CPU 318. The MPEG decoder 316 provides decompression of the video and audio signals in accordance with the MPEG standard. For example, a single-chip STi3520 MPEG decoder may be used. By way of example, reference is made to U.S. Pat. No. 5,198,901 to Lynch of Mar. 30, 1993; to U.S. Pat. No. 5,293,229 to Iu of Mar. 8, 1994; to U.S. Pat. No. 5,311,310 to Jozawa et al. of May 10, 1994; to U.S. Pat. No. 5,361,105 to Iu of Nov. 1, 1994; to U.S. Pat. No. 5,386,234 to Veltman et al. of Jan. 31, 1995; and to U.S. Pat. No. 5,400,076 to Iwamura of Mar. 21, 1995. Those disclosures and citations referenced therein may be consulted for an understanding of the specific details of conventional MPEG decompression arrangements.

The MPEG decoder 316 of the preferred embodiment is supported by a synchronous RAM 320 formed by four 256K×16 DRAMs with access speed of 70 ns capable of holding 3 full frames of MPEG video and audio data, and control information.

Decompressed video data in YUV format is fed to a digital video encoder 322. The decompressed audio data is supplied to the video encoder 322, and to a stereo audio digital-to-analog converter (DAC) 324 for converting digital audio signals into analog form. A single-chip AK4319 DAC manufactured by Asahi Kasei may be used as the DAC 324.

Operations of the satellite receiver 300 are supported by the CPU 318 such as a Motorola 68340 CPU chip running at 16 MHz. An external watch crystal is used to derive the 16 MHz internal clock. The CPU 318 may have a 16-bit external data bus, and a 32-bit data bus for internal operations. The CPU 318 may run the PSOS+ operating system developed by Integrated Systems Inc.

The CPU 318 is supported by a ROM 325, a SRAM 326, and an EEPROM 328. The ROM 325 that holds the PSOS+ operating system, menus, fonts, and other fixed data may be formed by two 4 Mbit masked ROM chips organized as 512K×8 with access speed of 95 ns.

The SRAM 326 formed, for example, by two 1 Mbit SRAM chips organized as 128K×8 with access speed of 70 ns, may be used for storing all active data such as system stacks, variables, menu data, etc. The ROM 325 and SRAM 326 may operate at a zero wait state to provide maximum performance.

The EEPROM 328, for example, a single 8K×8 EEPROM chip with access speed of 150 ns, may store non-volatile data such as user preferences.

To enhance the graphics presentation capabilities of the satellite receiver 300, a graphics accelerator 330 such as a MCD212 graphics accelerator manufactured by Motorola is used as a co-processor. The graphics accelerator 330 allows the receiver 300 to increase the rate of screen updates and to provide up to 256 colors in a graphics image. Also, the accelerator provides graphical effects such as wipes, dissolves, fades, etc. during transitions of menus on a TV screen, and supports operations of a remote pointing device such as an Airmouse®. This type of remote pointing device is manufactured by Seletech and Airmouse Remote Controls. The output of the graphics accelerator 330 produced in RGB format is fed to a converting circuit 332 for conversion into YUV format.

The graphics accelerator 330 may be supported by a synchronous 4 Mbit RAM 334 provided, for example, on a single 256K×16 DRAM chip with access speed of 70 ns. The RAM 334 used for storing graphics data is capable of storing two graphics planes with 720×480 pixel resolution. The graphics accelerator 330 allows two graphics planes to be combined to produce various graphical effects.

The graphics data from the conversion circuit 332, and decompressed video and audio data from the MPEG decoder 316, are supplied to separate inputs of the digital video encoder 322 such as a single-chip Phillips 7184 encoder. The video encoder 322 is responsible for encoding digital video, audio and graphics data to produce a combined composite signal in NTSC format. For example, U.S. Pat. No. 5,489,947 to Cooper of Feb. 6, 1996, incorporated herewith by reference, discloses on screen display (OSD) arrangement that allows the graphics data to be displayed on a TV set screen together with the image represented by the received video signals, or in place of this image. A single control bit may be used by the video encoder 322 to switch its output from graphics data to video and back.

The video encoder 322 also produces baseband video and audio signals. The baseband video signals are buffered by a pair of video operational amplifiers 336 coupled to video connectors. The baseband audio signals are fed to the stereo audio DAC 324 for converting to analog format and supplying to audio connectors. The video and audio connectors may be coupled to such external devices as stereo receivers, TVs or VCRs.

The combined composite signal from the video encoder 322 may be fed to a NTSC modulator 338 that modulates the composite signal to either channel 3 or 4 of a TV set coupled to the modulator 338. The modulator 338 also allows the combined composite signal to bypass a cable/antenna input of the TV set. Operations carried out to display video and graphical images on the TV set screen will be described in more detail later.

The TV set coupled to the satellite receiver 300 may display graphics data representing a graphical user interface (GUI) that allows a user to control operations of the satellite receiver 300, and provides user access to services and options offered by the digital satellite TV system. For example, graphics on the TV set screen may represent a graphical channel changer that enables a user to select TV channels. Another example of a graphical presentation on the TV screen is an electronic program guide that contains names of TV programs arranged in a 2-dimensional array, in which TV channels are listed vertically, and the time of broadcasting is listed in the horizontal direction. Various aspects of the GUI including the graphical channel changer and the electronic program guide are discussed in more detail later.

A modem 340 such as a single-chip SSI 1200-baud modem is provided to support communications via a narrowband port 342 used for low bandwidth signal transmission, or via a telephone jack connected to a telephone line. For example, the modem 340 may support remote billing and interactive services.

A microcontroller 344 such as a Phillips 87593 microcontroller provides control of receiver functions relating to control, interface and display devices arranged at the front panel of the satellite receiver 300. Among such devices are a pointing device interface 346, front panel controls 348, and a vacuum fluorescent display (VFD) 350.

The pointing device interface 346 enables a remote optical pointing device such as an Airmouse® to provide a wireless control of the satellite receiver 300. By way of example, reference is made to U.S. Pat. No. 5,045,843 to Hansen of Sep. 3, 1991, and U.S. Pat. No. 5,359,348 to Pilcher et al. of Oct. 25, 1994 for descriptions of Airmouse® arrangements and operation. For example, the pointing device interface 346 may comprise infrared (IR) transmitter and receiver that provide infrared communications with a pointing device located up to 7 meter away from the receiver 300 at an angle up to 45 degrees. This type of remote pointing device has been used principally for moving the cursor of a personal computer.

The Airmouse® type pointing device in accordance with the invention points directly at a TV set screen to provide direct interactions between the user hand that holds the pointing device, and the TV screen. The pointing device may comprise a cursor control circuit that moves a cursor on the TV screen in response to the position of the pointing device with respect to, for example, the IR transmitter at the front panel of the receiver. The pointing device interface 346 supports the GUI by providing and controlling the RF tuner 302 of the satellite receiver to respond to random, instant user access to any point on the TV screen. Selections are made by clicking one of the buttons on the pointing device. For example, at any time when there is no menu on the screen, a first click provides a basic control bar of menus across the bottom of the screen. The control menu bar remains active for a preset period, after which it is made invisible if no further signals from the pointing device are detected. TV control operations provided by the GUI will be described in more detail later.

In addition to the optical pointing device, a remote hand held control unit of the satellite receiver 300 may also include several dedicated buttons to provide, for example, switching power ON and OFF, channel and volume control, selection between regular TV broadcasting and satellite broadcasting, etc.

The front panel controls 348 provides control of the GUI in the event that the remote pointing device is missing or non-operable. The controls 348 may include a TV/Satellite receiver key for switching between regular TV broadcasting and satellite broadcasting. Set-up, menu, clear, select or "click" keys may be provided to control modes of operation. Cursor keys may be arranged to move the cursor on the TV screen in various directions.

The VFD 350 is provided to show current TV channel number and time. Also, the VFD 350 may indicate current incoming signal strength and other operational information.

Figure 2:
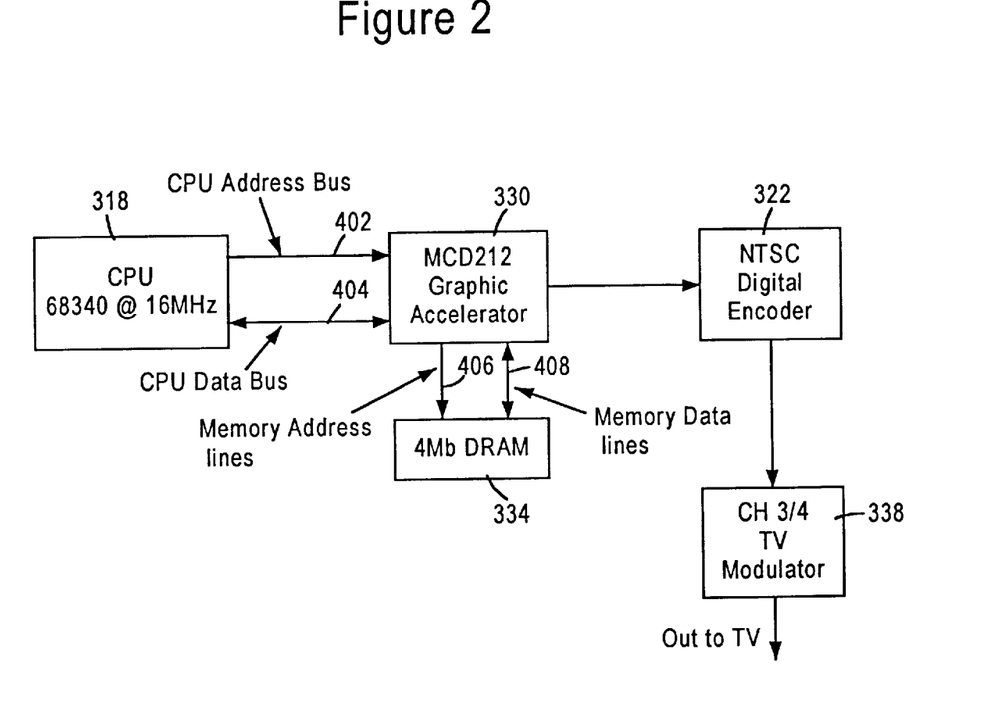
FIG. 2 is a block diagram illustrating a color graphic object drawing procedure.

Reference is now made to FIG. 2 that illustrates drawing color graphic objects on a TV screen according to the present invention. As discussed above, the CPU 318 interacts with the graphics accelerator 330 used as a co-processor to enhance the graphics capability of the satellite receiver 300. The CPU 318 may be coupled to the graphics accelerator 330 via an external 24-bit address bus 402, and a 16-bit data bus 404. The 24-bit address bus 402 enables the CPU 318 to address up to 16 Mbytes of a graphics memory. This storage capacity corresponds to an address space from 000000 to ffffff in hexadecimal notation. Various graphics memory arrangements may be organized in this address space, as long as each memory location is uniquely addressable. For example, the capacity of the graphics memory 334 may be equal to 4 Mbit or 512 Kbytes. Assuming that the graphics memory address space corresponds to the middle part of the system memory map, the $800000 hex address may be selected as the lowest graphics memory location, and the $87ffff hex address may be designated as the top graphics memory address. The graphics memory 334 may be coupled to the graphics accelerator 330 via memory address lines 406 and memory data lines 408.

The graphics accelerator 330 enables a TV set to display up to 16 million different colors. However, only 256 different colors can be displayed on any one screen at any given time. As a result, each unique pixel displayable on a TV screen can be represented by a single 8-bit value. Thus, each pixel stored in the 512 Kbyte graphics memory 334 is represented by a single 8-bit value or byte.

Each graphics plane stored in the graphics memory 334 is provided by a rectangular array of 720×480 pixels representing a picture on the TV screen. For example, the pixels may be stored in the graphics memory 334 from top left to bottom right in row order. Thus, the top left hand pixel of the screen resides at the $800000 hex graphics memory location. The second pixel on the top line 1 is stored at $800001 hex, etc. The last pixel of the top line 1 is held at $8002D0 hex. The first pixel of the next line 2 is at the $8002D1 hex graphics memory location, etc. The bottom right hand corner of the screen corresponds to the $8545ff location of the graphics memory 334. Thus, the graphics memory arrangement corresponds to a rectangular X,Y-coordinate system on the TV screen, where 720 pixels in each line of the array are arranged in the horizontal direction X, and 480 pixels in each row of the array are arranged in the vertical direction Y.

The graphics accelerator 330 contains a color look up table (CLUT) that converts 256 elements representing 8-bit pixel values stored in the graphics memory 334 into 24-bit values composed of red (R), green (G), and blue (B) bytes corresponding to R, G, and B components of a picture in RGB format. The CLUT may be programmed by the CPU 318 to reproduce any color possible in a 24-bit color space.

Figure 3:
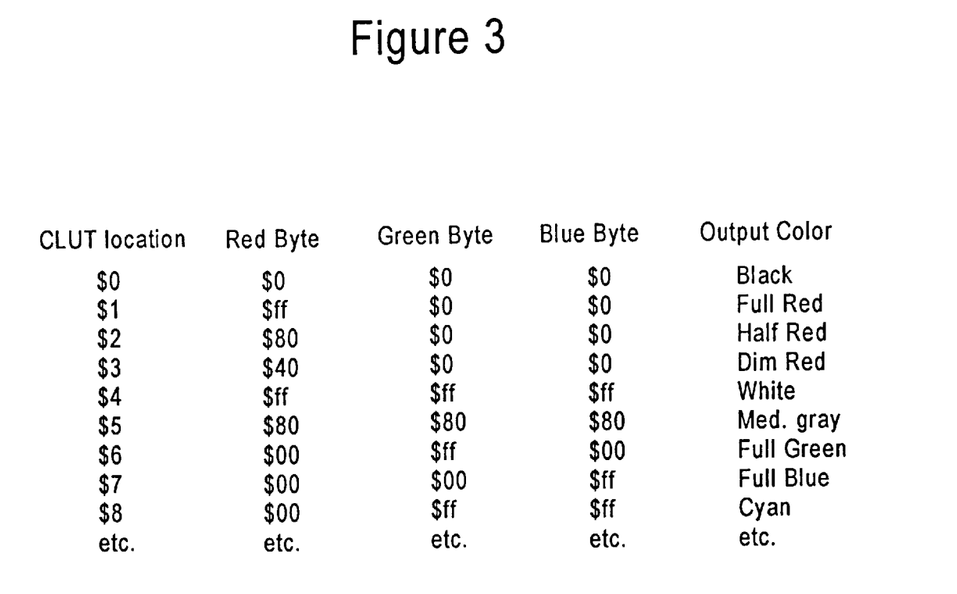
FIG. 3 illustrates contents of a color look up table.

FIG. 3 illustrates some typical colors reproducible by the CLUT. For example, black color composed of red, green and blue bytes represented by $0 hex may correspond to the $0 hex location of the CLUT. White color composed of the $ff hex red, green and blue bytes may correspond to the $4 hex CLUT location, etc.

When the CLUT is programmed, the CPU 318 accesses the graphics memory 334 to write data values representing graphics. The graphics accelerator 330 scans the graphics memory 334 at a rate of 13.5 MHz to read the graphics data. Each 8-bit pixel value is transferred to the CLUT that converts it into a 24-bit color value in RGB format. As discussed above, the converter 332 converts the RGB color value into YUV format, and passes a 24-bit digital YUV value to the digital encoder 322 that converts it into analog NTSC luminance and chrominance signals, for example, at a 13.5 MHz rate. The NTSC encoding procedure carried out by the encoder 322 is well known to those skilled in the art. The analog luminance and chrominance signals via the TV modulator 338 are supplied to the TV set.

Figure 4:
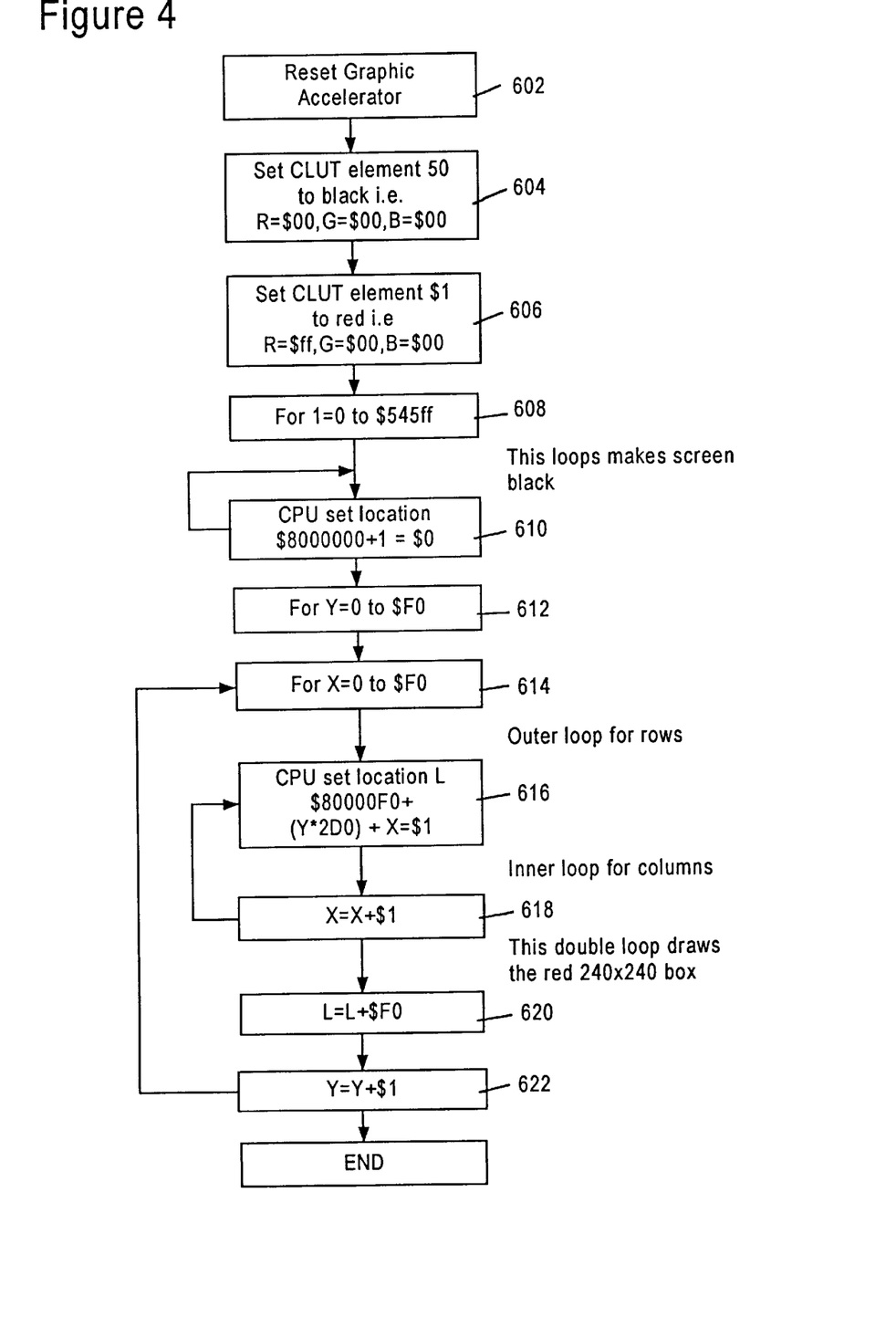
FIG. 4 is a flow chart illustrating an example of interactions between a CPU and graphics accelerator.

FIG. 4 shows a flow chart that illustrates an example of interactions between the CPU 318 and graphics accelerator 330 to draw a 240×240 pixel red square in the middle of a TV screen with a black background. In step 602, the CPU 318 resets the graphic accelerator 330. In step 604, the CPU 318 programs the CLUT in the graphics accelerator 330 so as to set CLUT location $0 hex to reproduce black color, i.e. red, green and blue bytes in this location are set to $0 hex. In step 606, the CPU 318 sets CLUT location $1 hex to reproduce red color, i.e. a red byte in this location is set to $ff hex, and green and blue bytes are set to $0 hex.

In steps 608 and 610, the CPU 318 carries out a loop to make the TV screen black. Locations $800000+I of the graphics memory 334 are set to $0 hex, for I that varies from $0 hex to $545ff hex.

In steps 612–622, the CPU 318 performs a double loop to draw the red 240×240 pixel box on the screen. The double loop comprises an outer loop carried out to set pixels in rows (Y-direction on the screen) of the graphics memory 334 to $1 hex to reproduce them in red color, and an inner loop to set pixels in lines (X-direction) of the graphics memory 334 to $1 hex to reproduce them in red color.

Figure 5:
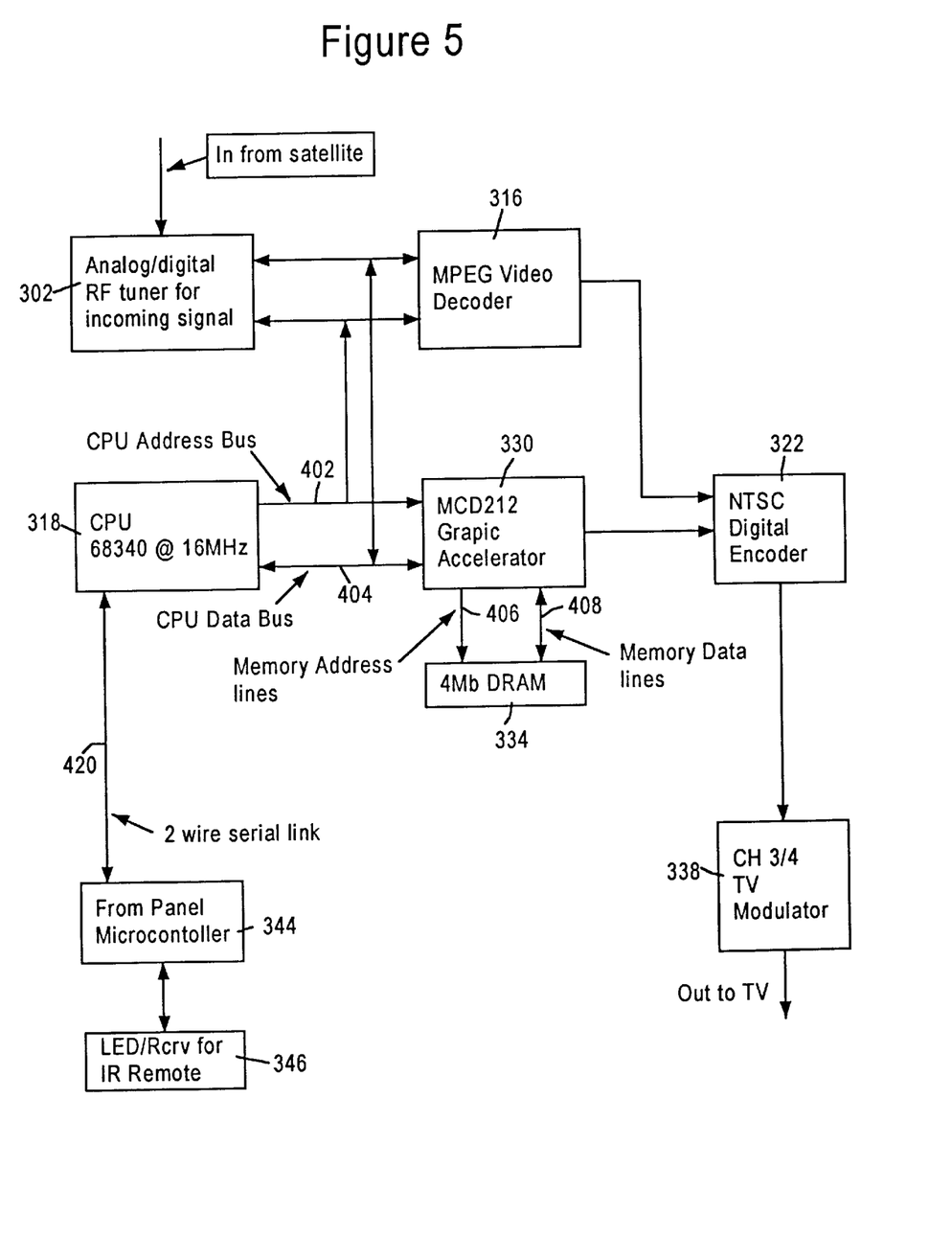
FIG. 5 is a block diagram illustrating hardware support for a graphical user interface.

Reference is now made to FIG. 5 that illustrates interactions between elements of the satellite receiver 300 to provide a user with random access to a Graphical User Interface (GUI) on a TV set screen. As discussed above, a remote pointing device such as an Airmouse® may be used to provide wireless remote control of satellite receiver operations. The pointing device provides direct interactions between the user hand that holds the pointing device, and the TV screen. The pointing device interface 346 comprises an infrared transmitter such as a LED and an infrared receiver arranged on the front panel for providing two-way wireless communications between the remote pointing device and the satellite receiver 300.

The pointing device interface 346 is connected to the front panel microcontroller 344 such as a Phillips 87593 microcontroller that causes the infrared transmitter to pulse in a predetermined pattern corresponding to a position of the remote pointing device with respect to the satellite receiver. Also, the microprocessor 344 conveys to the CPU 318 control information from the pointing device received by the infrared receiver. The CPU 318 is coupled to the front panel microcontroller 344 via a two-wire serial link 420 that provides bidirectional data transmission between the microcontroller 344 and the CPU 318.

The pointing device may comprise a position detector that responds to an infrared beam from the infrared transmitter by generating an error signal that indicates a change in a pointing device position. The error signal is transmitted to the infrared receiver of the pointing device interface 346. In response to the error signal, the microcontroller 344 supplies the CPU 318 with cursor control data to move a cursor on the TV screen in alignment with the movement of the pointing device. Also, the microcontroller 344 drives the infrared transmitter of the pointing device interface 346 to modify its pulse pattern in accordance with the movement of the pointing device. Buttons on the pointing device allow a user to make selections among various options offered on the screen. The same button may be clicked to activate the cursor and to make a selection. Alternatively, the button may be touched to initiate GUI operations.

The CPU 318 is coupled to the graphics accelerator 330 that enables the graphics display circuits of the satellite receiver 300 to keep up with fast movement of the pointing device. In response to the cursor control information from the CPU 318, the graphics accelerator 330 interacts with the CPU 318 to perform a cursor drawing procedure similar to the graphics drawing operations discussed above.

Figure 6:
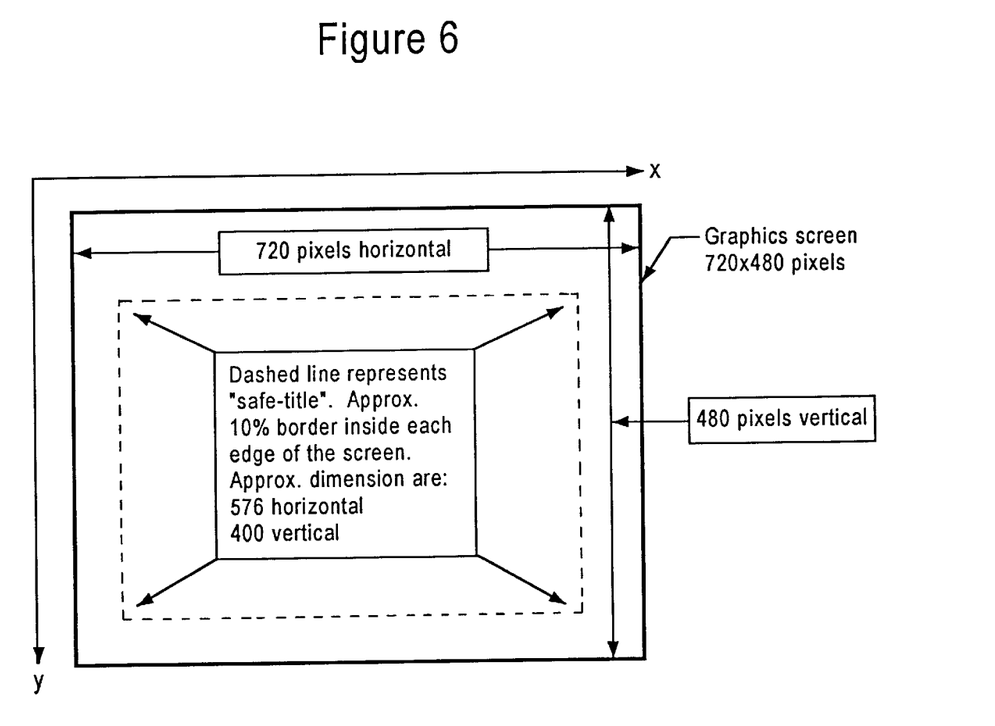
FIG. 6 is a diagram illustrating arrangement of pixels on a TV screen.

In particular, as shown in FIG. 6, the TV screen may may be represented by a 720×480 array of pixels corresponding to a graphics plane stored in the graphics memory 334. 720 pixels may be arranged on the screen in the horizontal direction X, whereas 480 pixels may be arranged in the vertical direction Y. To perform cursor drawing operations, the satellite receiver 300 may use an X, Y-coordinate system shown in FIG. 6, wherein coordinates X=0, Y=0 represent the top left hand corner of the TV screen, and coordinates X=720, Y=480 represent the bottom right hand corner of the screen.

It should be noted that due to "overscan" conditions, a television receiver may produce a raster on its screen so that pixels in the horizontal and vertical directions may not be entirely in the view of the user. Therefore, TV broadcast systems prevent images from being displayed outside of a "safe title" area located within approximately a 10% border all around the edge of the screen. As shown in FIG. 6, the safe title area contains approximately 576 pixels in the horizontal direction, and 400 pixels in the vertical direction.

When a motion of the user's hand that holds the pointing device requires the cursor to move across the screen from any initial position to a position selected by the user, the infrared receiver of the pointing device interface 346 receives a position change signal from the pointing device and relays this signal to the front panel microcontroller 344. In response to the cursor control data from the microcontroller 344, the CPU 318 generates X, Y-coordinates corresponding to a path for moving the cursor across the TV screen from the initial position to the selected position, with respect to the X, Y-coordinate system in FIG. 6. The path for moving the cursor may be a straight line to provide the shortest way to any selected position on the screen. X-coordinates may represent positions of the cursor with respect to the X-axis, whereas Y-coordinates may represent positions of the cursor with respect to the Y-axis. For example, when the cursor is in the center of the screen, its X-coordinate is equal to 360, and its Y- coordinate is equal to 240.

To provide movement of the cursor, CPU 318 and the graphics accelerator 330 carry out the graphics drawing operations discussed above to erase the cursor at its previous X,Y-position by filling the area to be erased with a transparent color. Then the cursor is redrawn at its new X, Y-position on the screen. Multiple erasure and redraw operations are performed along the path for moving the cursor until the cursor is redrawn in the position selected by the user. Intervals along the path between each position where the cursor is erased, and the next position where the cursor is redrawn are selected so as to provide the user with the impression of smooth cursor motion.

Figure 7:
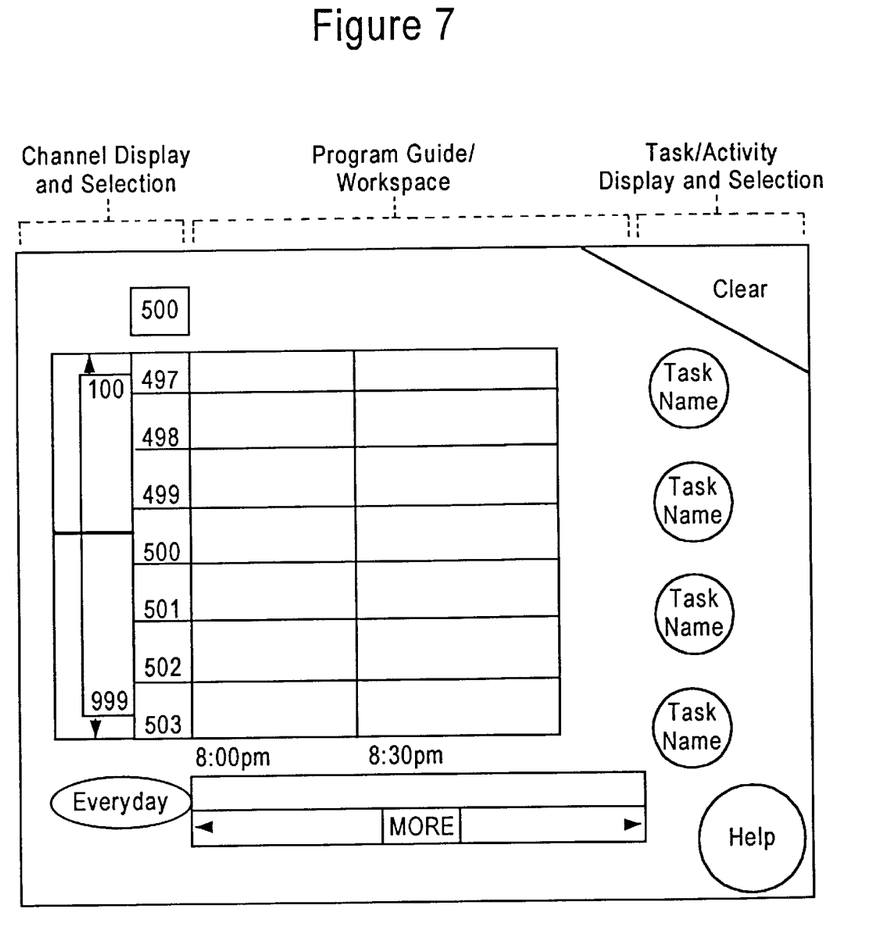
FIG. 7 illustrates an example of the GUI arrangement.

As discussed above, the TV set coupled to the satellite receiver 300 may display on its screen graphics data representing a GUI that contains multiple options to enable a user to control operations of the satellite receiver 300, and to have access to TV programs and services offered by the digital satellite TV system. An example of the TV screen design showing the GUI with multiple options simultaneously displayed on the screen is shown in FIG. 7. The left portion of the screen may display logos of TV channels to allow a user to select channels. The center portion of the screen may display the program guide and provide a workspace for performing tasks and activities. The right portion of the screen may represent areas showing available tasks and activities to allow the user to select among them. The satellite receiver 300 provides the user with random access to any of the options simultaneously displayed on the TV screen, i.e. the user may move the cursor from any initial position directly to any selected option.

Figure 8:
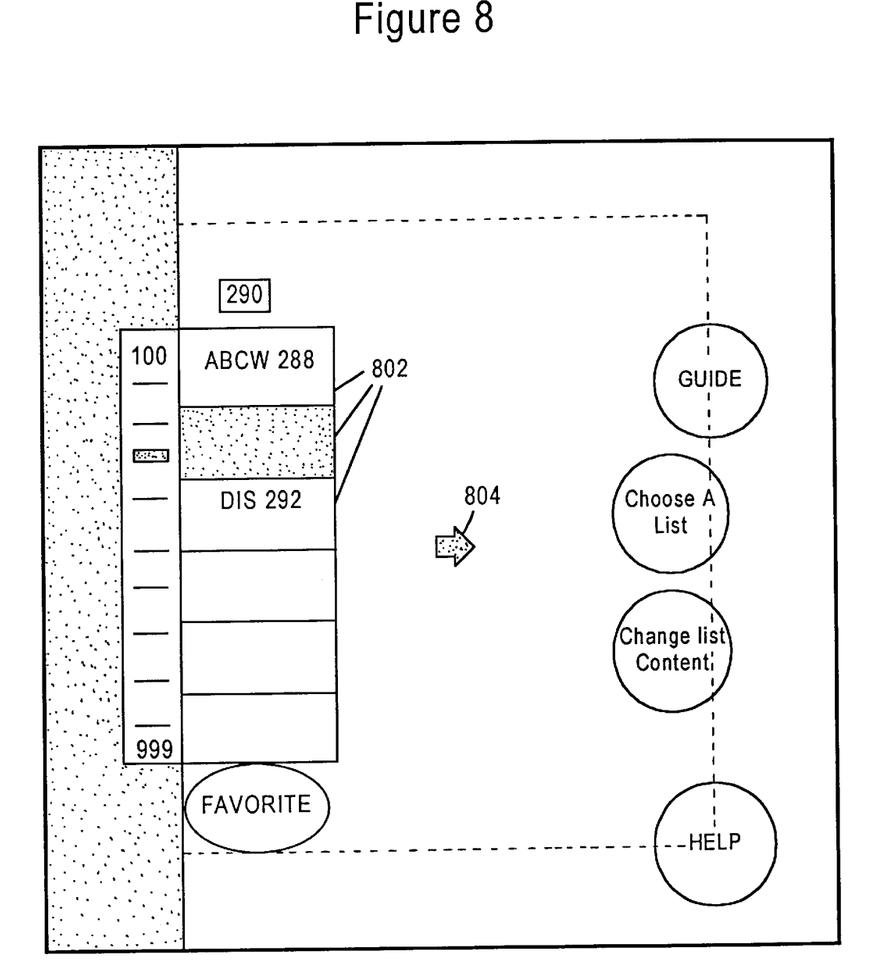
FIGS. 8–10 are diagrams illustrating a graphical channel changer.

For example, as shown in FIG. 8, the TV screen may display a graphical channel changer that comprises rectangular areas 802 containing logos of various TV channels. Each component of the graphical channel changer may be displayed using the above-discussed procedure of drawing color graphic objects on a TV screen.

The graphic changer illustrated in FIG. 8 contains the logos of channels ABCW 288 and DIS 292. As shown in a box arranged above the logos, TV channel 290 is currently selected. Its logo located between the ABCW 288 and DIS 292 logos is highlighted. A cursor 804 is shown in the center of the screen.

When a user moves the cursor 804 across the screen, the user input to the front panel microcontroller 344 causes the CPU 318 to generate X, Y coordinates corresponding to a path for moving the cursor to a new selected position. The path is random, i.e. no preset positions on the screen are required to be passed to reach any one of a plurality options simultaneously displayed on the screen.

Figure 9:
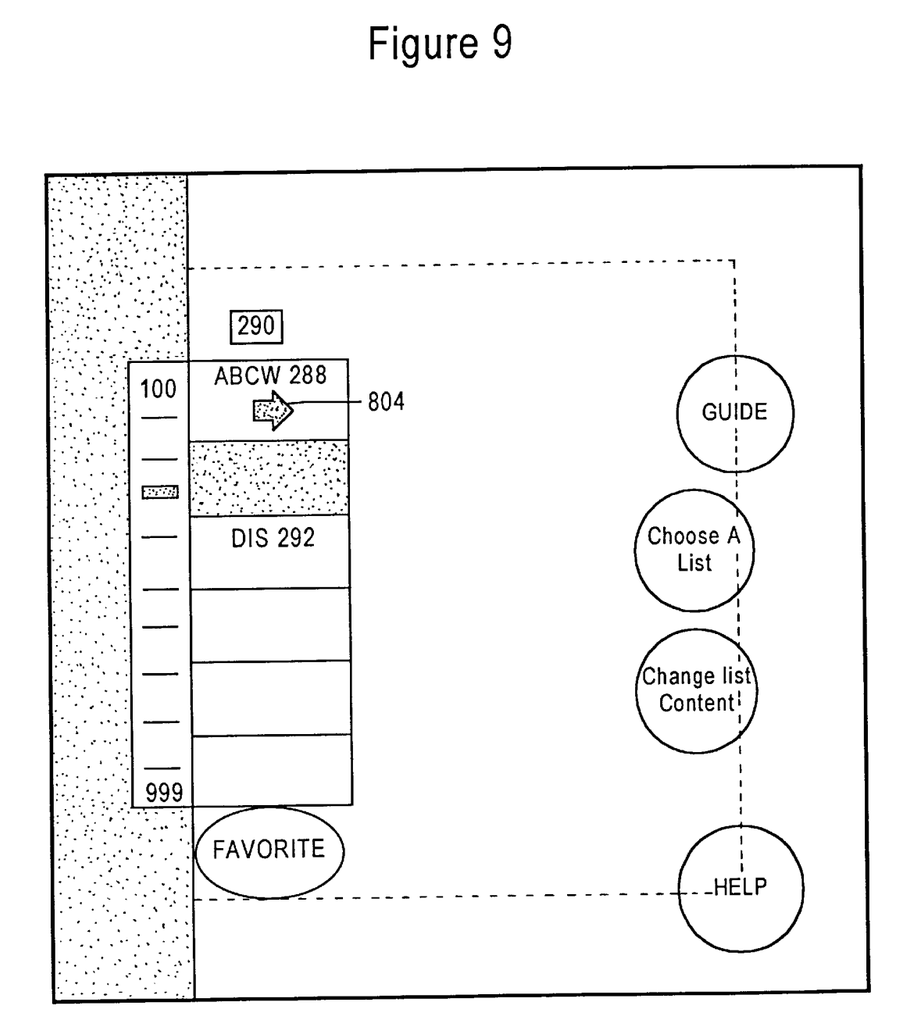

For example, as illustrated in FIG. 9, to switch the TV set to TV channel 288, the user has moved the cursor 804 to the area of the graphical changer that contains the logo for channel 288. The cursor movement is achieved by multiple erasures and redraws of the cursor image 804 performed on the path to the selected position. An interval between a position where the cursor image is erased and a subsequent position on the path where the cursor is redrawn is selected so as to imitate smooth cursor motion from the middle of the screen to the new cursor position corresponding approximately to coordinates X=180, Y=125.

Figure 10:
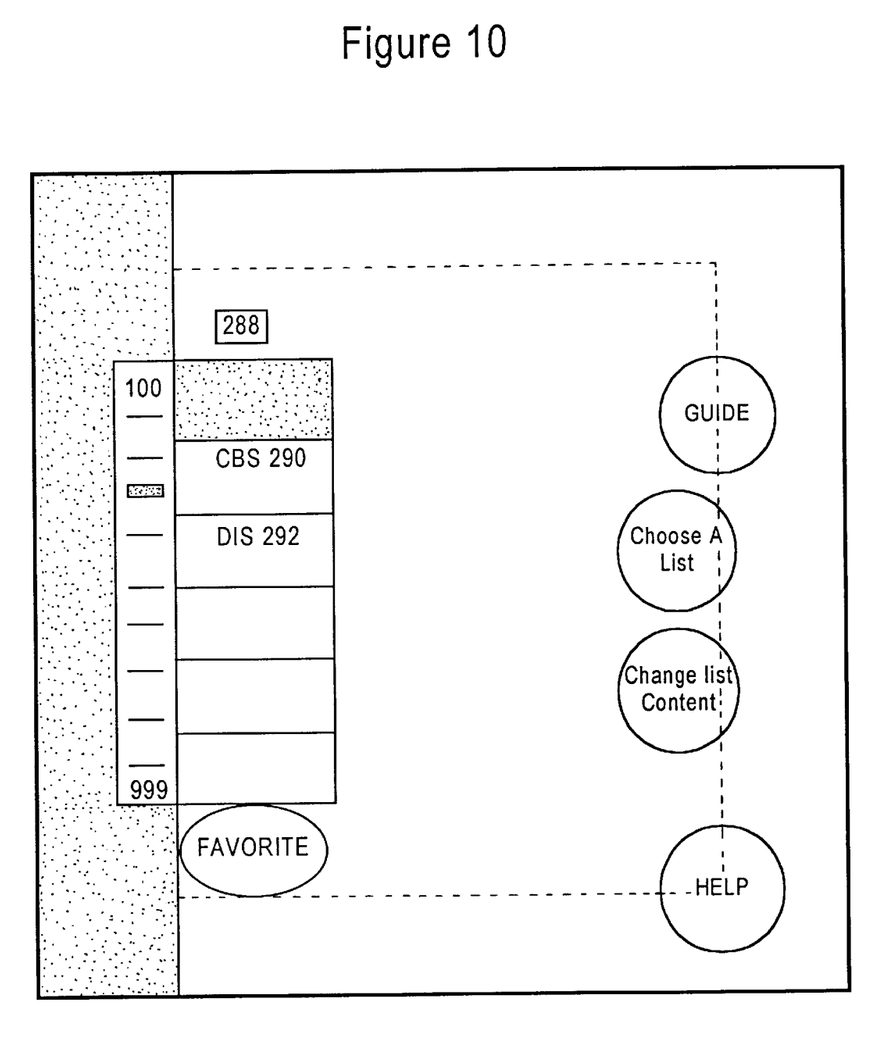

When the required cursor position is reached, the user may press a select button on the pointing device to tune to channel 288. As illustrated in FIG. 10, in response to the user command, drawing operations are performed to terminate highlighting of the 290 logo, and to highlight newly selected logo 288. These drawing operations include changing the background color in the areas of the logos 288 and 290. Also, the CPU 318 issues a draw command to change the numbers in the box above the logos from 290 to 288. Thus, the user obtains random access to any one among a plurality of options simultaneously displayed on the TV screen.

Referring again to FIG. 5, when the cursor reaches the logo 288, and the user presses the select button to make a selection, the CPU 318 sends a tune command to the RF tuner 302 to tune it to channel 288. In response to the tune command, the RF tuner 302 selects the carrier signal corresponding to channel 288, and converts the carrier frequency to produce the IF signal. Via the analog-to-digital converter 304, digital demultiplexer 306, and the transport chip 308, the received video signal compressed in accordance with the MPEG standard is fed to the MPEG decoder 316. The decompressed video signal is supplied to the NTSC encoder 322 that encodes the video signal, together with graphics data, to produce a combined composite TV signal to be displayed on the TV set. The combined composite TV signal allows graphics to be placed on top of the video on the TV screen.

There accordingly has been described a system that provides a GUI on a TV screen to facilitate user access to TV programs and services. The system supports interactions between the GUI and a remote pointing device to enable a user to have random access to any GUI option displayed on the TV screen. The GUI translates user inputs into actions on the screen to provide interactive control of TV operations.

In this disclosure, there are shown and described only the preferred embodiments of the invention, but it is to be understood that the invention is capable of changes and modifications within the scope of the inventive concept as expressed herein.

We claim:

1. A television system using a remote pointing device for providing user access to a graphical user interface displayed on a TV screen, comprising:
   a central processing unit (CPU),
   an interface control circuit controlled by said CPU for providing two-way wireless communications with said remote pointing device, and
   a graphics accelerator responsive to said CPU for displaying graphics data representing options offered by said graphical user interface, and for enabling said remote pointing device to provide random user access to the options simultaneously displayed on the TV screen.

2. The system of claim 1, wherein said graphical user interface comprises a graphical channel changer displayed on the TV screen to enable a user to select TV channels.

3. The system of claim 2, further comprising a radio-frequency tuner for selecting TV channels.

4. The system of claim 3, wherein said CPU provides a command to tune said radio-frequency tuner to a required TV channel in response to selecting said required TV channel on said graphical channel changer.

5. The system of claim 4, wherein said graphical channel changer comprises graphical objects displayed of the TV screen to represent various TV channels.

6. The system of claim 5, wherein said CPU tunes said radio-frequency tuner to a selected TV channel when the user holds said remote pointing device in the direction of a graphical object representing said selected TV channel.

7. The system of claim 1, further comprising a graphics memory for storing the graphics data as a two-dimensional array of data items representing a picture to be displayed on the TV screen.

8. The system of claim 7, wherein the data items in each line of the array represent pixels to be displayed in a first direction of the TV screen, and the data items in each row of the array represent pixels to be displayed in a second direction of the TV screen.

9. The system of claim 7, wherein said graphics accelerator comprises a color look-up table for translating first values of the data items stored in the graphics memory into second values representing pixels to be displayed on the TV screen.

10. The system of claim 9, wherein each of said second values comprises bytes representing red, green and blue components of the picture to be displayed on the TV screen.

11. The system of claim 1, wherein said CPU and said graphics accelerator interact to allow a cursor on the TV screen to be moved in response to motion of a user's hand.

12. The system of claim 11, wherein said CPU provides X, Y-coordinates of said cursor to represent cursor position on the TV screen.

13. The system of claim 12, wherein movement of said cursor is displayed by erasing a cursor image in a first position on the TV screen, and drawing the cursor image in a second position on the TV screen.

14. The system of claim 1, wherein said pointing device includes a single button which when clicked controls the pointing device to activate a cursor on the TV screen and to make a selection among said options.

15. The system of claim 1, wherein said pointing device includes a button which when touched causes display of an option on the TV screen.

16. In a television system, a method for providing user access to a graphical user interface displayed on a TV screen comprising the steps of:
   a) directing a remote pointing device at a selected position on the TV screen,
   b) receiving a position change data from said remote pointing device via a wireless communication link,
   c) generating cursor control data to control movement of a cursor image on the TV screen in response to said position change data,
   d) generating coordinates for defining a path on the TV screen for moving said cursor image to said selected position,
   e) erasing the cursor image displayed in an initial cursor position on said path, g) drawing the cursor image in an intermediate cursor position on said path, and f) repeating steps e and g until the intermediate position coincides with said selected position.

17. The method of claim 16, wherein said cursor image is moved from said initial position directly to said selected position via a straight path on the screen.

18. The method of claim 16, wherein said step of erasing comprises filling an area of the cursor image to be erased with transparent color.

19. A satellite television receiver for receiving television signals retransmitted via a direct broadcast satellite, comprising:

an RF tuner for selecting an appropriate carrier signal corresponding to a TV channel, a TV signal processing circuit for processing said carrier signal to produce video and audio data, a graphics circuit for producing graphics data to be displayed, a TV set for reproducing said video and audio data, and for displaying on a TV screen a graphical user interface representing said graphics data and including logos of available TV channels, and a remote pointing device for enabling a user to point at a logo of a selected TV channel displayed on the TV screen to tune said RF tuner to said selected TV channel.

20. The receiver of claim 19, wherein said remote pointing device causes a cursor on the TV screen to move from an initial position via a straight path to said logo of the selected TV channel.

* * * * *